(12) United States Patent  
Martinez

(10) Patent No.: US 7,758,055 B2
(45) Date of Patent: Jul. 20, 2010

(54) DOLLY WITH WHEEL LOCK

(75) Inventor: David Martinez, Williamsport, PA (US)

(73) Assignee: Shop-Vac Corporation, Williamsport, PA (US)

( * ) Notice: Subject to any disclaimer, the term of this patent is extended or adjusted under 35 U.S.C. 154(b) by 329 days.

(21) Appl. No.: 11/782,106

(22) Filed: Jul. 24, 2007

(65) Prior Publication Data

US 2009/0026721 A1 Jan. 29, 2009

(51) Int. Cl.
B62B 5/04 (2006.01)
(52) U.S. Cl. .................. 280/79.5; 280/47.35; 188/29
(58) Field of Classification Search ............ 280/47.131, 280/47.17, 47.34, 47.35, 79.11, 79.5; 188/29, 188/31, 2 F, 220.6, 221.1, 1.12
See application file for complete search history.

(56) References Cited

U.S. PATENT DOCUMENTS

| 2,262,433 | A | * | 11/1941 | Uecker et al. | ............... | 16/35 R |
| 3,117,653 | A |   | 1/1964  | Altherr |   |   |
| 3,930,630 | A | * | 1/1976  | Wulff | .......................... | 248/129 |
| 4,349,937 | A | * | 9/1982  | Fontana | ....................... | 16/35 R |
| 5,042,622 | A | * | 8/1991  | Smith et al. | ................ | 188/1.12 |
| 5,497,856 | A | * | 3/1996  | Block et al. | ................. | 188/1.12 |
| 5,784,757 | A |   | 7/1998  | Cipolla |   |   |
| 6,102,167 | A | * | 8/2000  | Chiu | ........................... | 188/20 |

(Continued)

FOREIGN PATENT DOCUMENTS

BE 692893 7/1967

(Continued)

OTHER PUBLICATIONS

Dec. 2, 2005 advertisement of Clarke Company "Flood Sucker" Vacuum (WAP SQ17AE).

(Continued)

*Primary Examiner*—Lesley Morris
*Assistant Examiner*—John D Walters
(74) *Attorney, Agent, or Firm*—Marshall, Gerstein & Borun LLP; Robert M. Gerstein; Richard M. LaBarge

(57) ABSTRACT

A system for locking the wheels of a dolly for a cleaning device has a brake arm that has one end that is hinged to the base of the dolly. The brake arm pivots between a disengaged position and an engaged position where a stop on an opposite end of the brake arm engages the circumference of one of the wheels on the dolly. A spring biases the brake arm to the disengaged position. The spring can be mounted on a pin that is seated on the base and extends through a slot in the brake arm. An operator-engagable lever is used to move the brake arm from one position to another. The lever can be hinged to the pin, pivoting into and out of a locked position in which the lever presses the brake arm into the engaged position. A cam surface on the lever is shaped so that moving the lever to one side of a critical point causes the lever to be biased toward the locked position, and moving the lever to the other side of the critical point causes the lever to be biased toward the unlocked position. The part of the lever that abuts the brake arm when the lever is in the locked position can be a flat section on the cam surface.

8 Claims, 8 Drawing Sheets

U.S. PATENT DOCUMENTS

| | | | |
|---|---|---|---|
| 6,381,804 B1 | 5/2002 | Paterson et al. | |
| 7,389,563 B2 * | 6/2008 | Martinez et al. | 15/327.1 |
| 2007/0124885 A1 | 6/2007 | Martinez et al. | |

FOREIGN PATENT DOCUMENTS

| | | |
|---|---|---|
| EP | 204040 A1 * | 12/1986 |
| WO | WO-2004/006820 | 1/2004 |

OTHER PUBLICATIONS

Nov. 28, 2005 advertisement of Goodway Commercial Title Wet-Dry Vacuum 115V (EV-60-T).

Nov. 28, 2005 advertisement of Nilfisk-ALTO Wet & Dry Vacuum (ATTIX 761-21 XC 230/50 EU).

Nov. 28, 2005 advertisement of Nilfisk-ALTO Wet & Dry Vacuum (ATTIX 751-11 230/1/50 EU).

Nov. 28, 2005 advertisement of Nilfisk-ALTO Wet & Dry Vacuum (ATTIX 751-21 230/1/50 EU).

Nov. 28, 2005 advertisement of Nilfisk-ALTO Wet & Dry Vacuum (MAXXI WD7 230/1/50/ EU).

Extended European Search Report for corresponding European Patent Application No. 08160465.4 (Aug. 28, 2009).

* cited by examiner

DOLLY WITH WHEEL LOCK

CROSS-REFERENCE TO RELATED APPLICATIONS

Not applicable.

BACKGROUND OF THE INVENTION

The present invention relates generally to cleaning devices, and more particularly to cleaning devices that can take in liquid; devices such as wet/dry vacuums. Wet/dry vacuums include a tank that can be used to hold the liquid and often has a wide mouth on top that can be used to pour liquid from the tank.

When filled with liquid, the tank in a wet/dry vacuum can be heavy. For large units, such as those for heavy-duty use in commercial or industrial settings, the weight can make it difficult to unload the tank.

Heavy-duty wet-dry vacuums are sometimes mounted on a dolly. For ease of emptying, a tilt bar is sometimes provided on the dolly. The tilt bar provides a support that can be used to help tilt the tank for emptying.

The use of a tilt bar can be awkward. When using a conventional tilt bar, the tank can sometimes flip over the tilt bar, or the cart itself can tip over or move laterally. Both are usually undesirable.

BRIEF SUMMARY

A new wheel locking system has been developed for locking the wheels of a dolly that is used with a cleaning device. The system has a brake arm that is hinged to the base of the dolly and pivots between a) an engaged position in which part of the brake arm engages one of the wheels on the dolly and b) a disengaged position in which the brake arm is disengaged from the wheel.

A spring is used to urge the brake arm to the disengaged position. The spring can be mounted on a pin that extends through a slot in the brake arm. The pin has a head on one end that is seated in a well on the base.

An operator-engagable lever is used to move the brake arm from one position to another. The lever can be hinged to one end of the pin, creating a third-class lever arrangement. The lever pivots between a locked position and an unlocked position. In the locked position, a part of the lever presses the brake arm into the engaged position. In the unlocked position, the part of the lever that presses the brake arm into the engaged position is in a different position, enabling the spring to push the brake arm to the disengaged position.

The part of the lever that presses the brake arm can be a cam surface. The cam surface can be shaped so that moving the lever to one side of a critical point causes the lever to be biased toward the locked position, and moving the lever to the other side of the critical point causes the lever to be biased toward the unlocked position. The part of the lever that abuts the brake arm when the lever is in the locked position can be a flat section on the cam surface.

BRIEF DESCRIPTION OF THE DRAWINGS

The invention may be better understood by referring to the accompanying drawings, in which.

DETAILED DESCRIPTION

Figure 1:
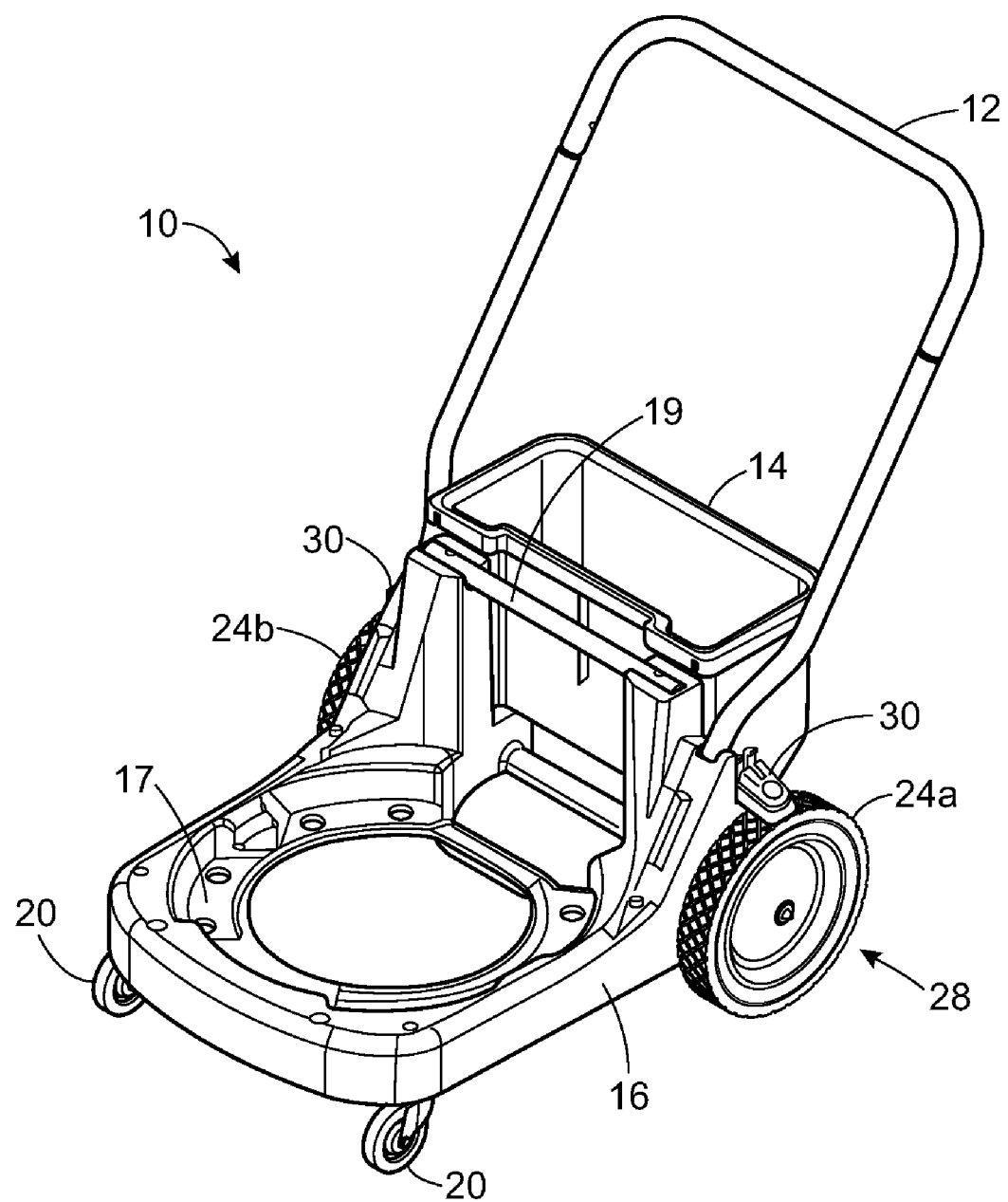
FIG. 1 is a perspective view of one kind of dolly with a wheel lock that embodies the invention.
Figure 2:
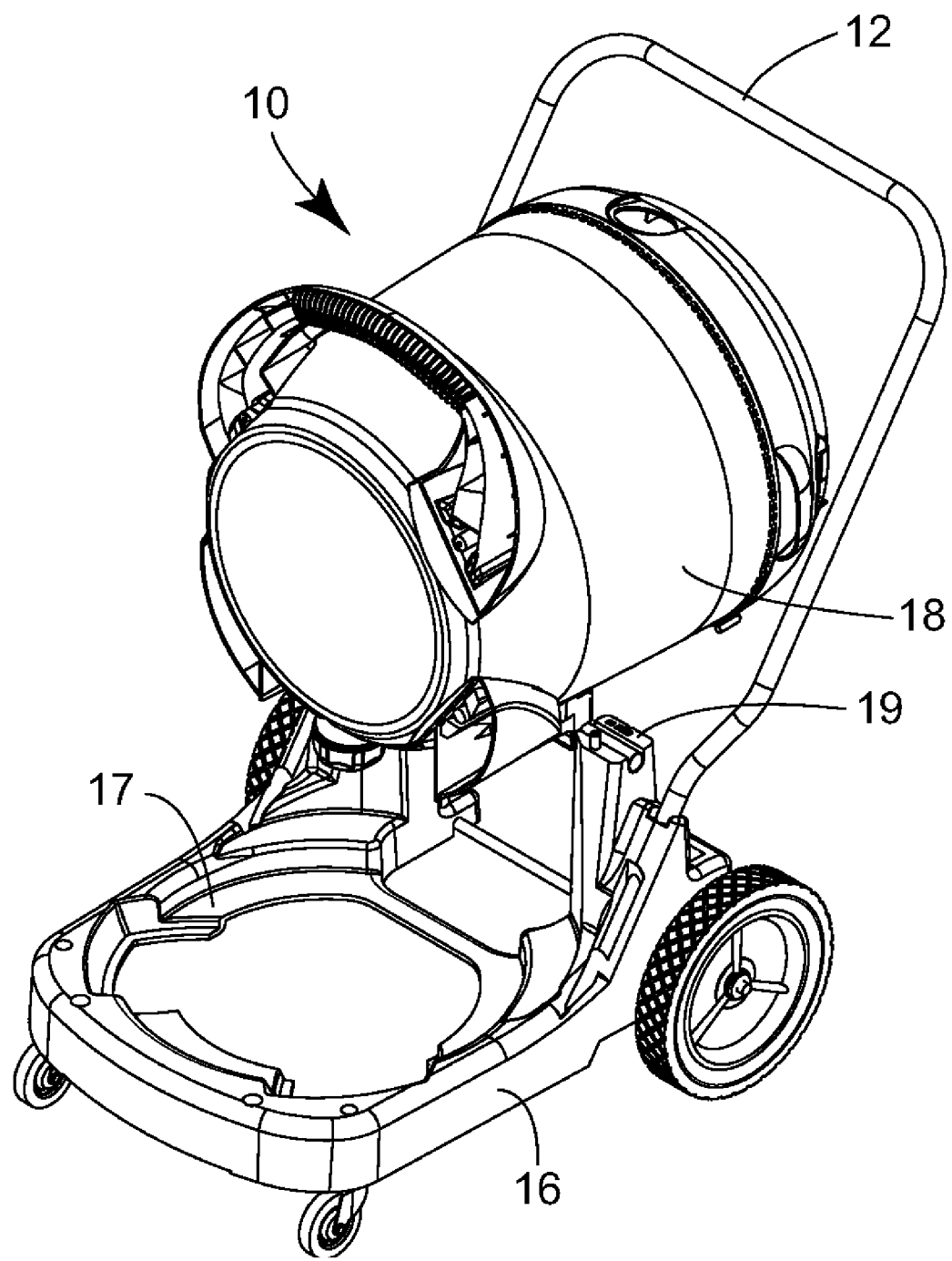
FIG. 2 is a perspective view of the dolly seen in FIG. 1a, with a wet/dry vacuum mounted on the dolly and tilted to a dumping position.
Figure 3:
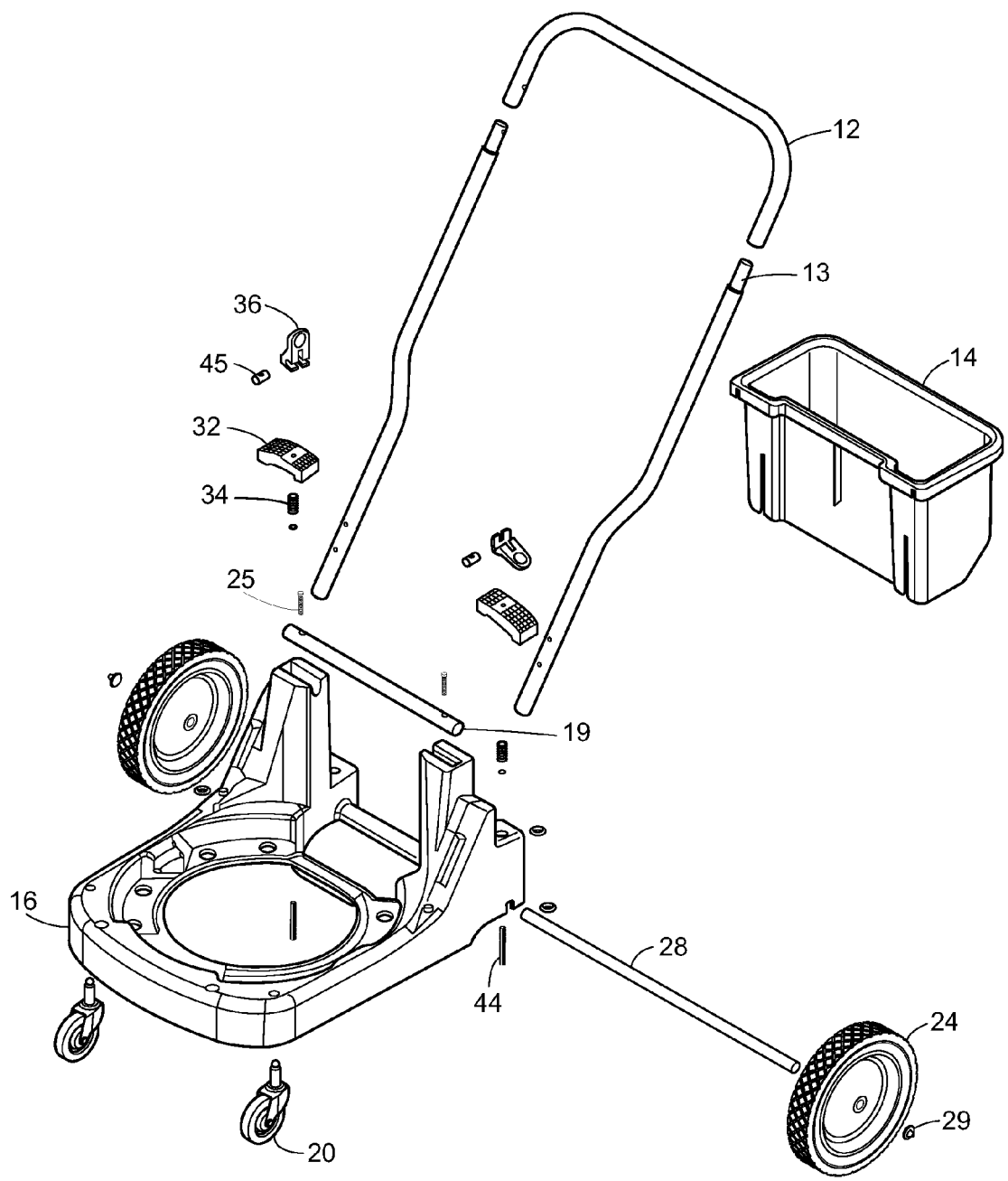
FIG. 3 is an exploded view of the dolly seen in FIG. 1.
Figure 4:
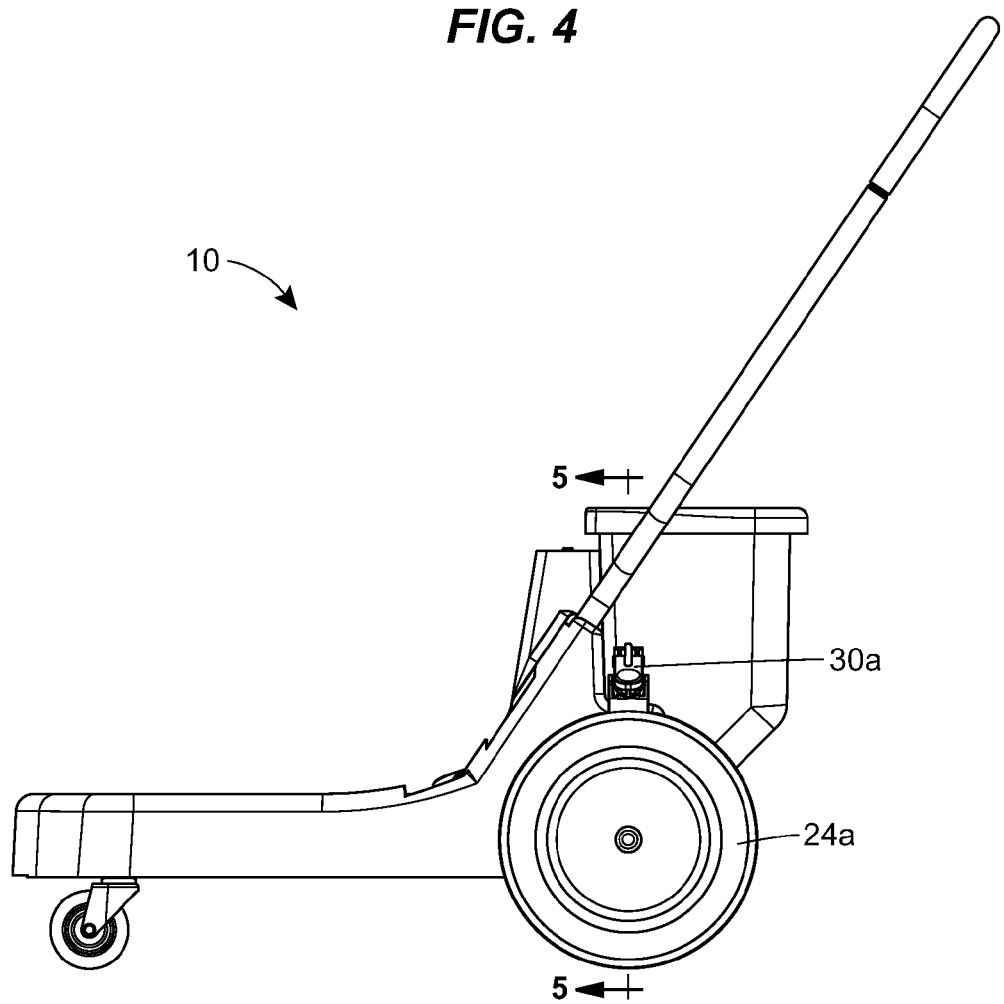
FIG. 4 is a side view of the dolly seen in FIG. 1.

FIGS. 1-4 illustrate a dolly 10 that has a wheel lock that can be used with a cleaning device such as a wet/dry vacuum cleaner. The illustrated dolly has a tubular handle 12 connected to tubular uprights 13 and an optional basket 14. As described in more detail below, the dolly 10 also has a base 16, wheels 20, 24, and a pair of brakes.

The Base

The base 16 is used to facilitate the transportation and the dumping of the contents of a tank on a cleaning device or similar apparatus. In this case, the base 16 is sized to receive the bottom of a wet/dry vacuum cleaner 18. The base 16 has a recess 17 that is sized to receive the vacuum cleaner. This recess 17 is designed to securely hold the cleaning device, aiding in resistance to lateral and vertical movements. The tank can be secured in the recess in a variety of ways known in the art, such as locking tabs, integrated clamps, or other such fastening methods.

The base 16 also includes a pivot 19 on which the wet/dry vacuum cleaner 18 can be hinged. The pivot enables the tank on the vacuum cleaner 18 to be swung so that the contents of the tank can be dumped. Structure for accomplishing this is described in more detail in the U.S. patent publication no. 2007-0124885 A1, the disclosure of which in hereby incorporated by reference. The pivot may be tubular or solid in design, and is positioned sideways on the base 16 above the rear wheels 24. The illustrate pivot is held in place by a pair of pan-head screws 25. It is positioned above the base to provide a stable axis around which the tank of the vacuum cleaner can be rotated, thus facilitating the safe removal of the contents in a rearward direction, toward the rear of the dolly 10.

The Wheels

The wheels on the illustrated dolly 10 include a pair of front wheels 20 and a rear set of parallel wheels 24. The illustrated parallel wheels include a left rear wheel 24a and a right rear wheel 24b, both of which have large outer circumferences that make the dolly 10 more stable and easier to move, especially when the vacuum cleaner 18 is full of fluid. The wheels can be made of any conventional material, such as plastic. The illustrated rear wheels are 10-inch diameter, non-marring wheels. Although it is preferred for the parallel wheels to be set on a common axis, this may not always be necessary. In some cases it may be preferred to use the front wheels 20 (or the left-side wheels or the right-side wheels) as the parallel wheels, rather than the rear wheels 24. In this illustration, the parallel wheels 24 are mounted on a single axle 28 that extends along the common axis. Each wheel is held on the axle by a conventional push nut 29. Mounting the wheels on a single axis is merely optional. In some circumstances, the wheels might be mounted on separate mounting stems.

Preferably, the axis of the parallel wheels 24 is between 0 and 6 inches behind the pivot 19, so that when the cleaning device is on the dolly 10, the common axis of the parallel wheels is laterally between the pivot 19 and the center of gravity of the unit. This arrangement helps to prevent the dolly 10 from upsetting when the pivot 19 is used to dump the contents from the tank.

The details of the other wheels on the dolly 10 (in this case, the front wheels 20) are generally not important. Preferably, the other wheels are arranged to enable the dolly 10 to be easily turned. In the illustration, the two front wheels 20 are 3" diameter heavy-duty casters. Other arrangements are possible. For example, a single front caster could be used, or a pair of wheels could be mounted on a shiftable axle.

The Brakes

Figure 5:
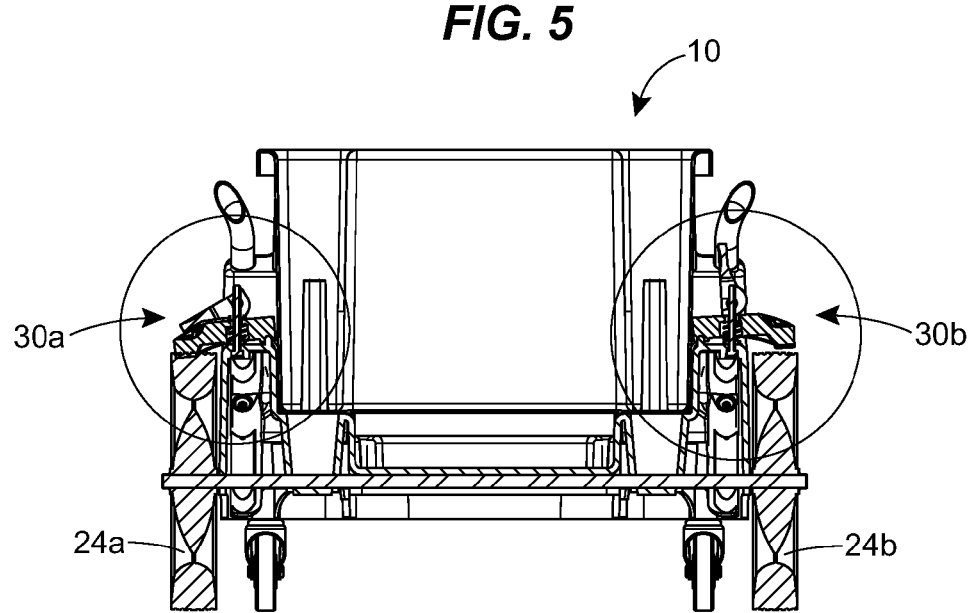
FIG. 5 is a view along sectioning line 5-5 of FIG. 4.

As seen in FIG. 5, the illustrated dolly 10 has two separate brakes 30a, 30b, one for each of the parallel wheels 24. In some circumstances, a separate brake 30 for each wheel may not be necessary. For example, when both parallel wheels are fixed to a common axle, in some circumstances it may be sufficient to provide a brake 30 on only one wheel, or on the axis itself.

Figure 6:
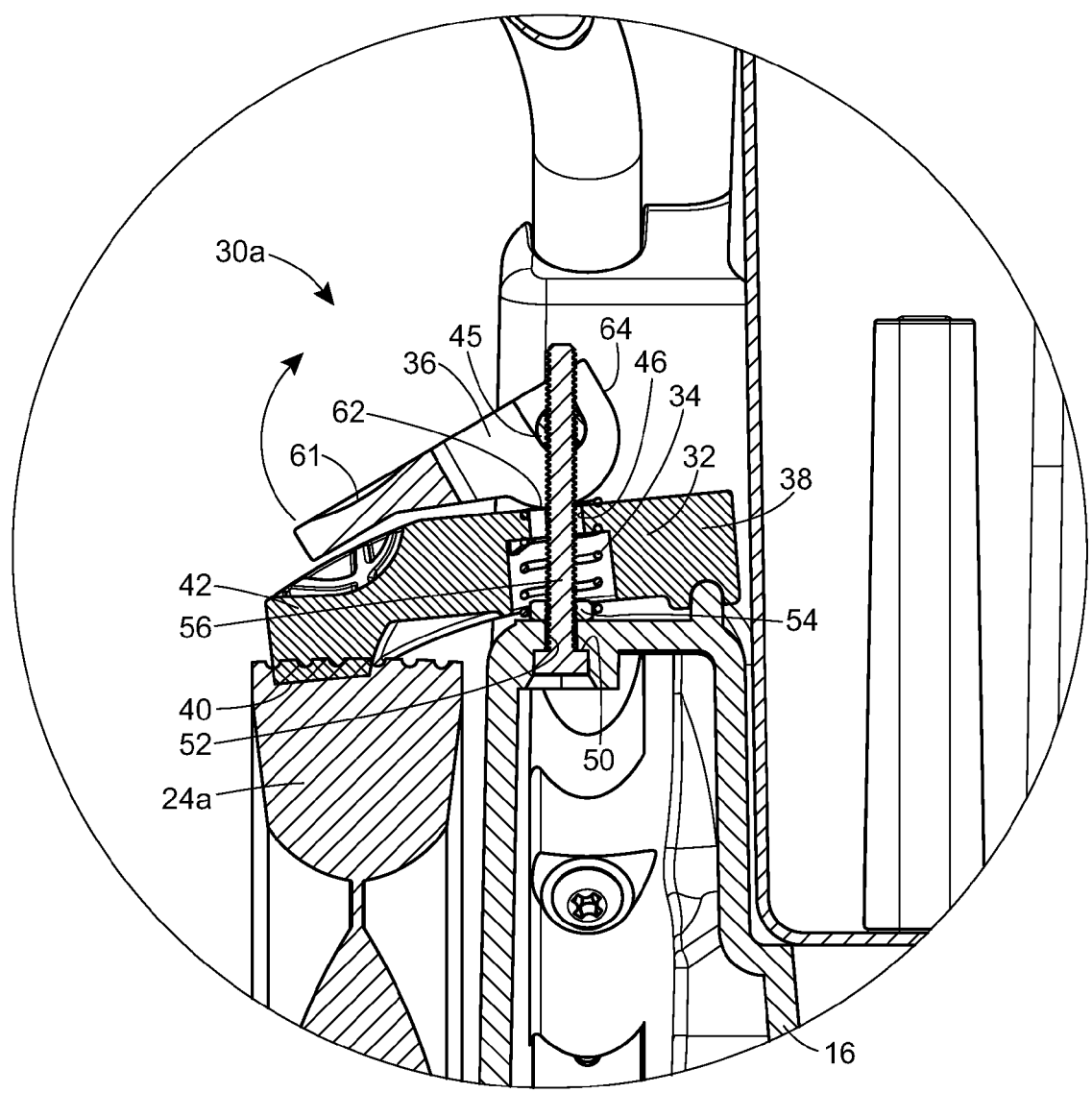
FIG. 6 is a close-up view of the wheel lock seen on the left side of FIG. 5.
Figure 7:
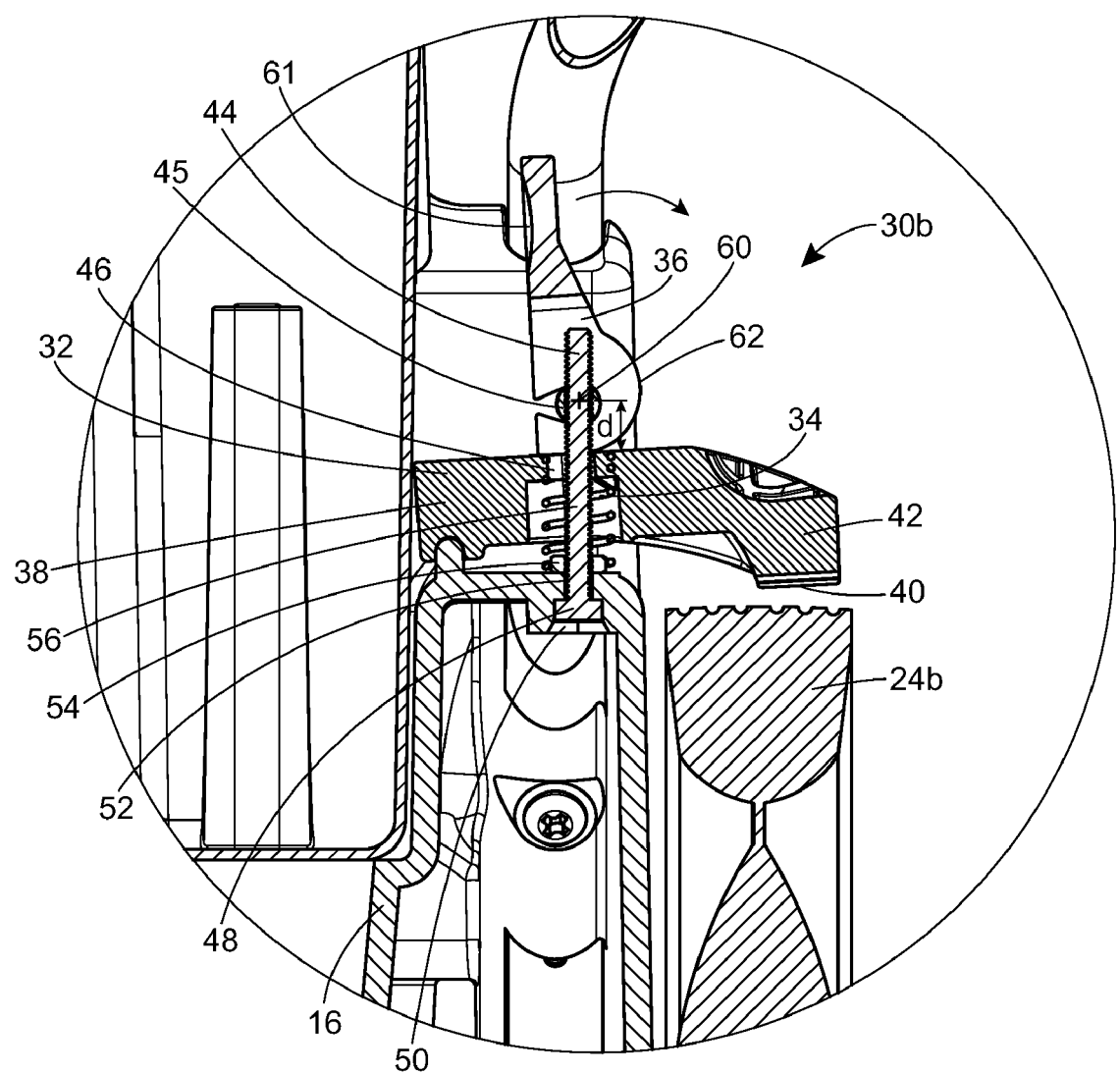
FIG. 7 is a close-up view of the wheel lock seen on the right side of FIG. 5.
Figure 8:
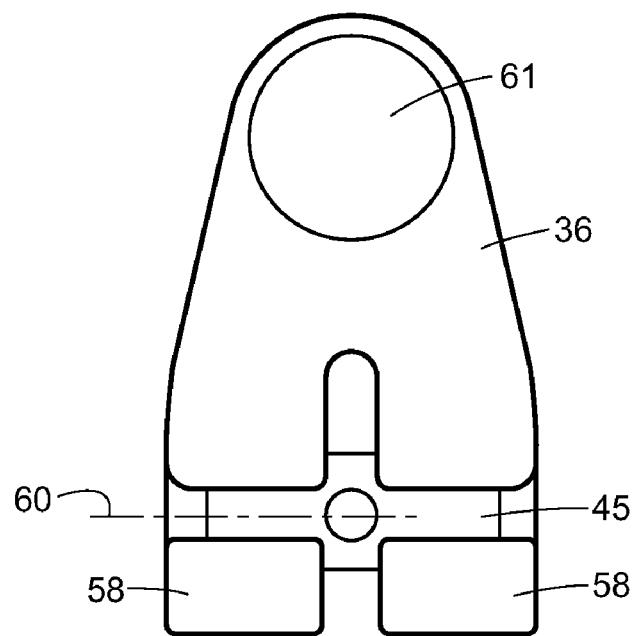
FIG. 8 is a top view of the lever seen in FIGS. 5 and 6.

As seen in FIGS. 6 and 7, each illustrated brake 30 has a brake arm 32, a spring 34, and an operator-engagable lever 36. These elements will be discussed in more detail below.

The Brake Arm

The brake arm 32 is made of a stiff material such as metal or plastic, and is strong enough to withstand forces associated with its use as a lever. The brake arm has two opposed ends. One end 38 of the illustrated brake arm is hinged to the base 16 so that it pivots between an engaged position and a disengaged position. In the engaged position (seen in FIG. 6), part of the brake arm engages one of the parallel wheels, in this instance the left rear wheel 24a. In the disengaged position (seen in FIG. 7), the brake arm 32 is disengaged from its associated wheel, in this instance the right rear wheel 24b.

The other, distal end 42 of the brake arm 32 has a stop 40. The stop 40 is positioned to engage with and disengage from the adjacent wheel. In this example, it is positioned on the underside of the distal end 42 of the brake arm 32 and engages the outer circumference of the associated rear wheel 24, locking it against rotation. Other arrangements are possible. In this example, the stop (seen in FIG. 7) is a piece of rubber or comparable material that is adhered or mechanically fastened to the end of the brake arm. A separate material is not always required; the stop could simply be an end surface of the brake arm.

The Spring

The spring 34 is used to bias the brake arm 32 to the disengaged position. Although a variety of different arrangements might be used, the illustrated spring 34 is a metal helical coil compression spring, and is disposed on a pin 44 that extends through a slot 46 in the brake arm 32.

The pin 44 seen in FIG. 5 is a vertically-mounted 2.5" long hex-head machine screw that has a head 48 that sits in a well 50 formed on the opposite side of a hole 52 in the base 16. Other products could be used. An optional hex nut 54 can be mounted on the pin 44 to hold it in place.

The spring 34 is positioned around a middle portion 56 of the pin 44 that projects above the hole 52. The spring can be positioned by simply lowering it over the upper end of the pin during the assembly process. Above the spring, the upper end of the pin passes through a slot 46 that is positioned laterally between the two ends 38, 42 of the brake arm 32. The spring 34 is thus trapped between the base 16 and the brake arm. In this arrangement, the spring biases the central portion of the brake arm away from the base. Because one end 38 of the brake arm is hinged to the base, this arrangement creates a third class lever that urges the distal end 42 of the brake arm away from the associated wheel 24 to the disengaged position.

The Lever

The brake arm 32 can be moved back from the disengaged position to the engaged position through the use of the operator-engagable lever 36. The illustrated lever is made of metal or sturdy plastic and is installed on the pin 44. In the illustrated example, the upper end of the pin is threaded and a cross-dowel nut 45 in the lever is turned onto those threads. The lever could also be attached in other ways, such as by a press fit or by a lock washer and nut. The lever is positioned so that it is hinged at a hinge axis 60 on the pin is at a distance "d" above the top surface of the brake arm 32 when the brake arm 32 is in the disengaged position.

The lever can be attached in a variety of ways. As seen in FIG. 7, the illustrated lever 36 is arranged so that the cross-dowel nut 45 fits within a circular cylindrical recess formed in two arms 58 in the lever. A hollow area between the two arms enables the lever to pivot around the pin 44, moving between a locked position and an unlocked position. In the locked position (seen in FIG. 6), the lever 36 presses the brake arm 32 into the engaged position. In the unlocked position (seen in FIG. 7), the spring 34 is able to push the brake arm 32 into the disengaged position. This will be described in more detail below.

A finger grip 61 is positioned outwardly from the hinge axis 60, and can be used to move the lever 36 from one position to another.

As best seen in FIGS. 6 and 7, the surface of the illustrated lever 36 is curved where it abuts the top surface of the brake arm 32. The distance between the hinge axis 60 and a first cam surface 62 on the lever 36 exceeds the distance "d", so that when the lever is moved so that the first cam surface 62 abuts the top surface of the brake arm 32 (as seen in FIG. 6), the structure of the lever forces the top surface of the brake arm 32 downwards from the disengaged position, against the force of the spring 34.

The distance between the hinge axis 60 and a second cam surface 64 on the lever 36 is less than or equal to the distance "d", so that when the lever 36 is moved so that the second cam surface 64 abuts the top surface of the brake arm 32 (the position seen in FIG. 7), the force of the spring 34 can push the brake arm 32 toward the disengaged position.

Figure 9:
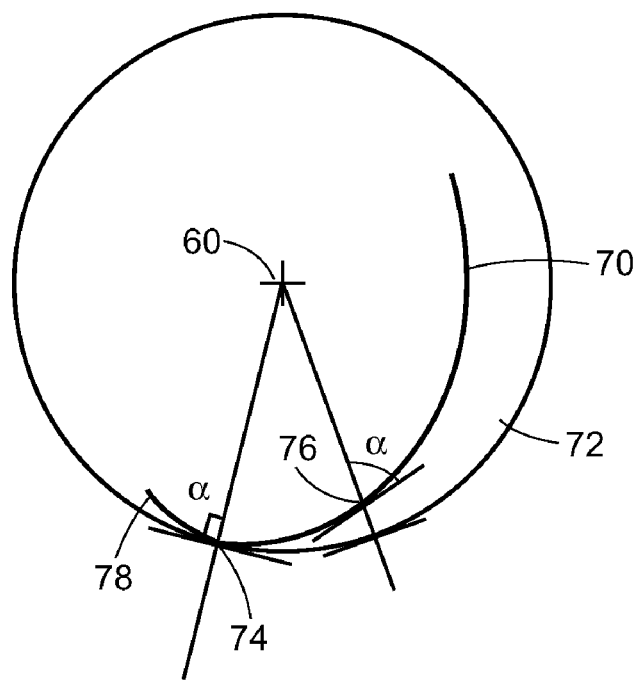
FIG. 9 is a schematic view of the cam surface of the lever seen in FIGS. 5 and 6.

The cam surface on the lever 36 can be specifically shaped so that, once the lever is moved beyond a critical position, interaction between the lever and the brake arm 32 biases the lever toward the locked position. For example, the cam surface of the lever 36 can be shaped with a profile 70 like that seen in FIG. 9. The chief characteristics of that profile can be seen by comparing it to a constant radius profile 72. The cam profile 70 has a critical point 74 that is farther from the hinge axis 60 than any other point on the cam surface. The angle a between a) a radial line that extends through that critical point and the hinge axis 60 and b) a line that is tangential to the cam surface at that critical point, is a right angle. At points 76 on the cam surface to the right of the critical point, and at points 78 on the cam surface to the left of the critical point, the angle α between a radial line through the other point and a tangential line through that other point is less than 90 degrees. When the illustrated cam profile is used, moving the lever 36 slightly clockwise from the position where the critical point 74 abuts the brake arm 32 causes one of the points 76 to the right of the critical point to move into contact with the brake arm. Because of the shape of the surface, the force of the spring then biases the lever to rotate further in the clockwise direction. In the same way, moving the lever 36 slightly counter-clockwise from the position where the critical point abuts the brake arm causes one of the points 78 to the left of the critical point to move into contact with the brake arm, and the force of the spring biases the lever to rotate further in the counter-clockwise direction.

Positioning the critical point 74 between the cam positions 62 and 64 described above can provide advantages. With such an arrangement, when the lever 36 is moved from the unlocked position beyond the position where the critical point 74 abuts the brake arm 32, the lever 36 is biased further towards the locked position. This biasing would help to prevent the brake 30 from being accidentally unlocked. Conversely, once the lever is moved from the locked position beyond the position where the critical point abuts the brake arm, the lever would be biased further towards the unlocked position. This would help to assure that the brake 30 is fully disengaged.

In most cases, it would be important in these arrangements that the distance between the hinge axis 60 and the critical point 74 exceed the distance "d" by enough to assure that, when the critical point abuts the brake arm 32, the stop 40 is firmly engaging the wheel.

Figure 10:
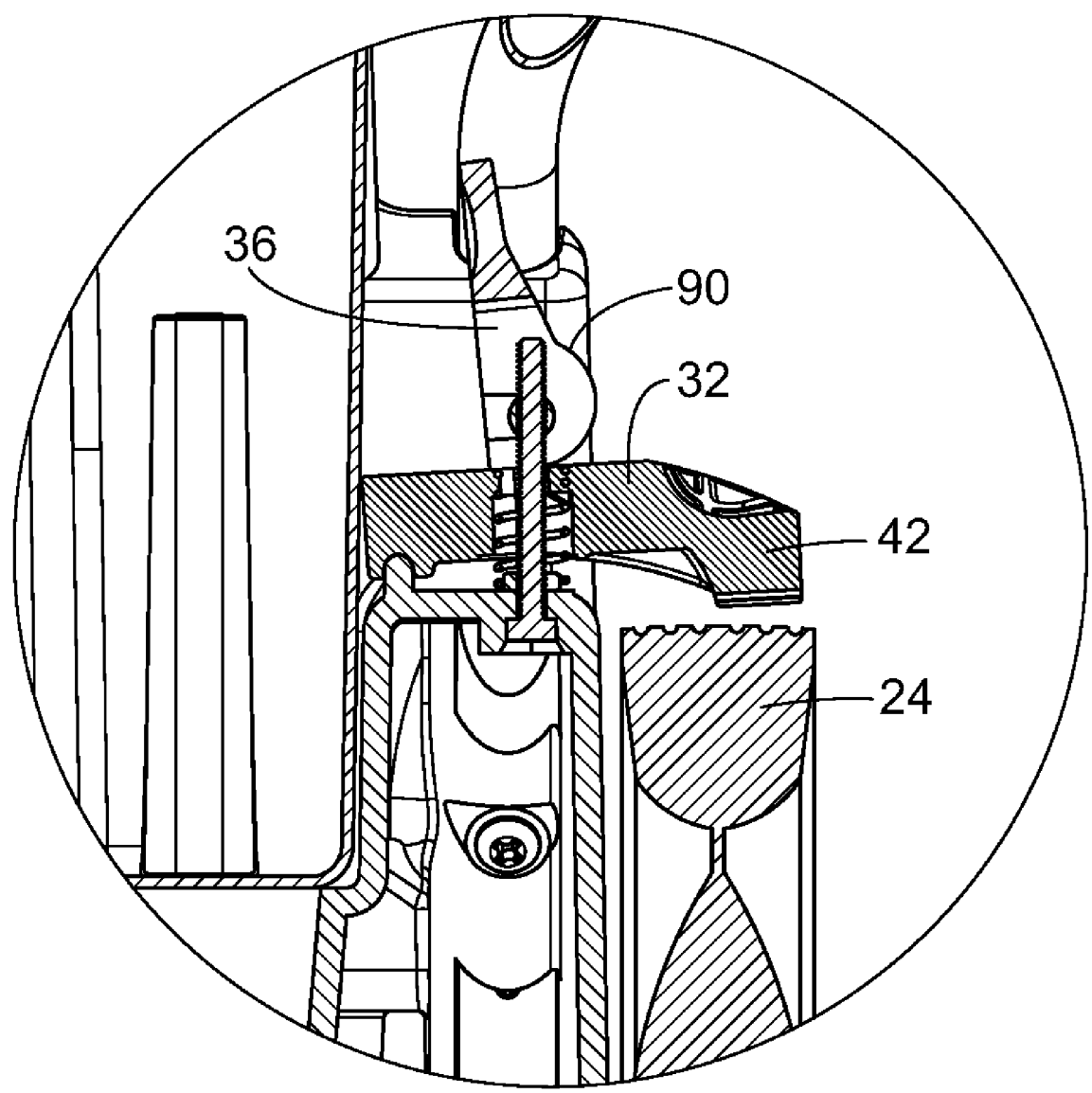
FIG. 10 is a close-up view, corresponding to the view of FIG. 7, of an alternate embodiment of a wheel lock.

The cam surface on the lever 36 can also be provided with a flat section 90, as seen in FIG. 10. The illustrated flat section is the part of the lever that presses against the brake arm 32 when the lever is in the locked position. Providing a surface on the lever that rests flat against the top surface of the brake arm can provide a detent action when the lever is in the locked position, holding it in that position.

Although other arrangements are possible, the illustrated lever 36 provides a third class lever that can be used to press the brake arm 32 into the engaged position. The lever 36 might also be located in other positions, providing (for example) a first class lever or a second class lever.

This description of various embodiments of the invention has been provided for illustrative purposes. Revisions or modifications may be apparent to those of ordinary skill in the art without departing from the invention. The full scope of the invention is set forth in the following claims.

The invention claimed is:

1. A dolly that is used with a cleaning device, and has:
a base;
a set of parallel wheels;
a brake arm that is hinged to the base and pivots between a) an engaged position in which part of the brake arm acts to retard rotation of one of the parallel wheels and b) a disengaged position in which the brake arm is disengaged from the wheel;
a spring that biases the brake arm to the disengaged position;
a pin that is connected to the base and extends through a slot in the brake arm; and
an operator-engagable lever that is hinged to an end of the pin and pivots between a) a locked position in which a part of the lever presses the brake arm into the engaged position and b) an unlocked position in which the part of the lever that presses the brake arm into the engaged position is in a different position, enabling the spring to move the brake arm into the disengaged position.

2. A dolly as recited in claim 1, in which:
the spring is disposed on the pin.

3. A dolly as recited in claim 1, in which:
the spring is disposed around the pin;
the pin has a head on one end, opposite the end where the lever is hinged; and
the base has a hole with a well on an opposite side that holds the head on the pin.

4. A dolly that is used with a cleaning device, and has:
a base;
a set of parallel wheels;
a brake arm that has one opposed end that is hinged to the base and pivots between a) an engaged position in which part of the brake arm at an opposed end of the brake arm engages one of the parallel wheels and retards rotation of that wheel, and b) a disengaged position in which the brake arm is disengaged from the wheel;
a slot that is positioned on the brake arm laterally between the two opposed ends of the brake arm; and
a spring that biases the brake arm to the disengaged position;
an operator-engagable lever that is hinged to a pin that extends through the slot in the brake arm, creating a third class lever that pivots between a) a locked position in which a part of the lever presses the brake arm into the engaged position and b) an unlocked position in which the part of the lever that presses the brake arm into the engaged position is in a different position, enabling the spring to move the brake arm into the disengaged position.

5. A dolly as recited in claim 4, in which
the brake arm also has a slot that is positioned laterally between the two opposed ends of the brake arm; and
the spring is disposed on a pin that extends through the slot in the brake arm, creating the third class lever.

6. A dolly as recited in claim 4, in which:
the pin is connected to the base;
the lever is hinged to the pin, creating a third class lever that can be used to press the brake arm toward the engaged position; and
the spring is disposed on the pin, creating a third class lever that urges the brake arm toward the disengaged position.

7. A dolly that is used with a cleaning device, and has:
a base;
a set of parallel wheels;
a brake arm that is hinged to the base and pivots between a) an engaged position in which part of the brake arm acts to retard rotation of one of the parallel wheels and b) a disengaged position in which the brake arm is disengaged from the wheel;
a spring that biases the brake arm to the disengaged position;
an operator-engagable lever that pivots about a pivot axis between a) a locked position in which a part of the lever presses the brake arm into the engaged position and b) an unlocked position in which the part of the lever that presses the brake arm into the engaged position is in a different position, enabling the spring to move the brake arm into the disengaged position; and
a surface on the lever that has:
a first point that engages the brake arm in the engaged position;
a second point that engages the brake arm in the disengaged position and is located closer to the pivot axis than the locking point is; and
a third point that is between the locked point and the unlocked point, temporarily engages the brake arm as it is moved between the locked and unlocked positions, and is located farther from the pivot axis than either the first point or the second point is.

8. A dolly as recited in claim 7, in which:
the part of the brake arm that engages the wheel engages the outer circumference of the wheel.

* * * * *